(12) United States Patent
Fåhraeus et al.

(10) Patent No.: US 6,563,951 B2
(45) Date of Patent: *May 13, 2003

(54) METHOD AND A DEVICE FOR MATCHING IMAGES

(75) Inventors: Christer Fåhraeus, Lund (SE); Ola Hugosson, Lund (SE); Petter Ericson, Malmö (SE)

(73) Assignee: C Technologies AB, Lund (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/024,641

(22) Filed: Feb. 17, 1998

(65) Prior Publication Data

US 2001/0028741 A1 Oct. 11, 2001

(30) Foreign Application Priority Data

Dec. 30, 1997 (SE) ................................................ 9704924

(51) Int. Cl.⁷ ................................................. G06K 9/62
(52) U.S. Cl. ........................ 382/216; 382/218; 382/318
(58) Field of Search ................. 382/318, 218, 382/219, 216, 294, 154, 217

(56) References Cited

U.S. PATENT DOCUMENTS

| 4,949,391 A | * | 8/1990 | Faulkerson et al. ........... 382/56 |
| 5,054,089 A | | 10/1991 | Uchida et al. ................. 382/4 |
| 5,280,545 A | * | 1/1994 | Masuda ....................... 382/318 |
| 5,539,841 A | * | 7/1996 | Huttenlocher et al. ....... 382/218 |
| 5,640,468 A | | 6/1997 | Hsu .............................. 2/190 |
| 5,812,704 A | * | 9/1998 | Pearson et al. ............. 382/318 |
| 5,825,924 A | * | 10/1998 | Kobayashi .................. 382/219 |
| 5,930,411 A | * | 7/1999 | Kojima et al. .............. 382/318 |

* cited by examiner

Primary Examiner—Thomas D. Lee
(74) Attorney, Agent, or Firm—Cooper & Dunham LLP

(57) ABSTRACT

In a method for matching two images, each consisting of a plurality of pixels and having partially overlapping contents, the degree of correspondence between the contents of the images is determined for different displacement positions representing different overlappings of the images. More specifically, a plurality of numbers are determined for each one of a plurality of said displacement positions. Each number is formed with the aid of pixel values from both images and is used to simultaneously retrieve predefined overlap assessment values for at least two of said displacement positions. The overlap assessment values retrieved are subsequently used to determine the degree of correspondence between the images for the different displacement positions. The method is carried out with the aid of a computer and can be implemented as a computer program.

28 Claims, 5 Drawing Sheets

55=5·11

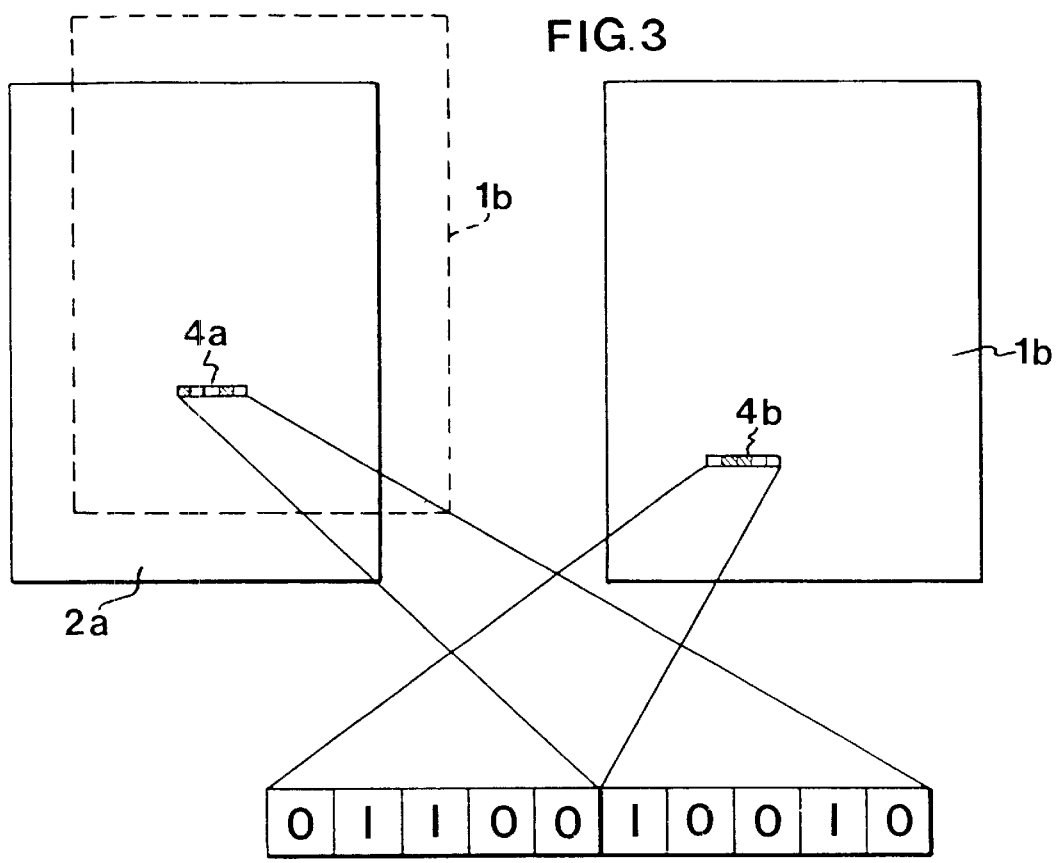
FIG.3
FIG.5
Score 0
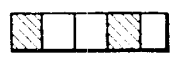
0+0+0+0+1=1
Score 1
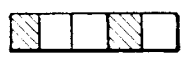
1+0+2+1=4
Score 2
1+2+0=3
Score 3
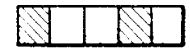
0+0=0
Score 4
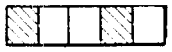
1=1

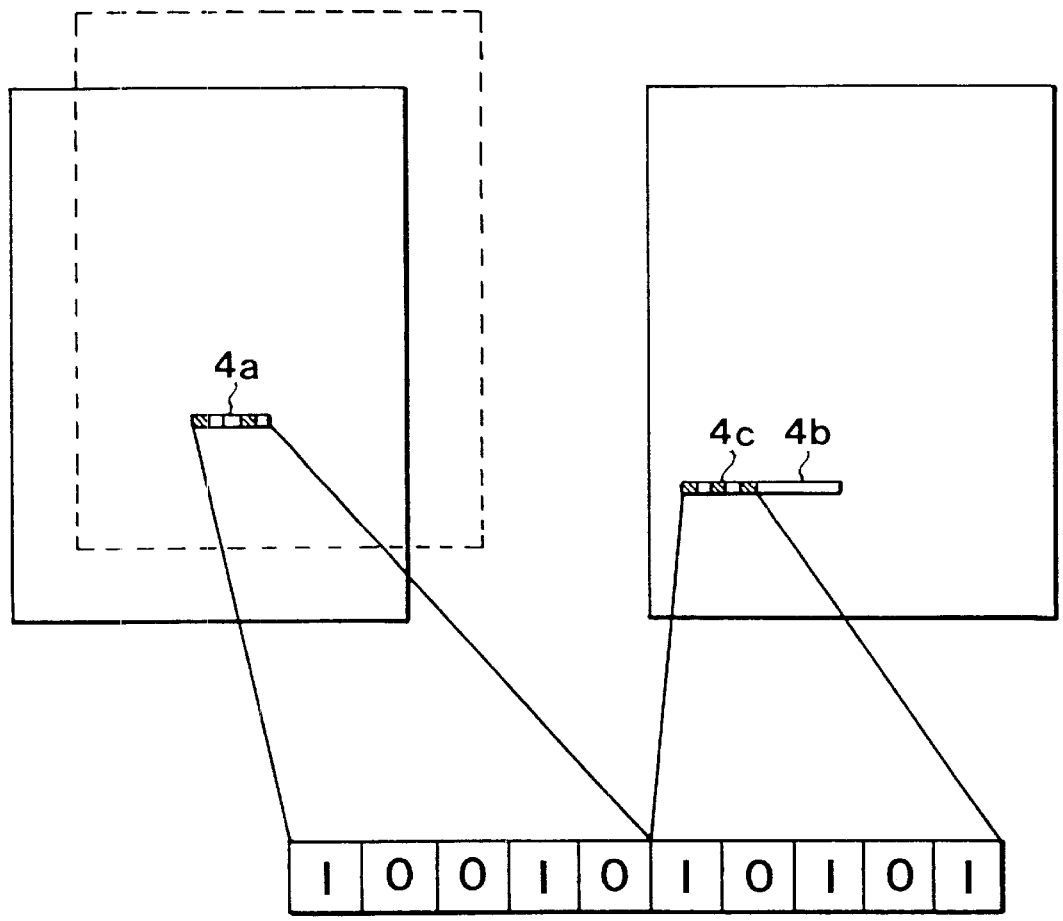

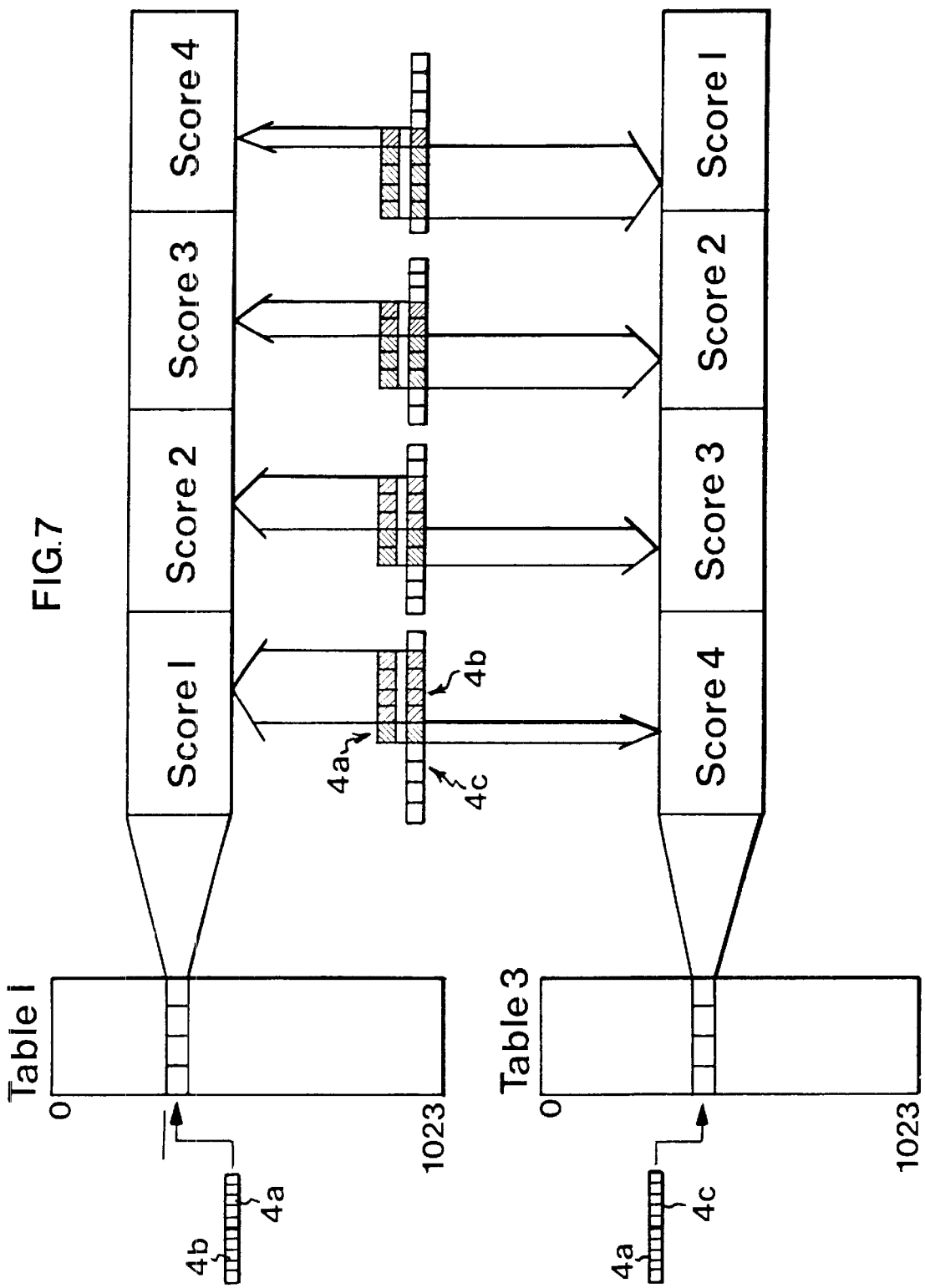

METHOD AND A DEVICE FOR MATCHING IMAGES

FIELD OF THE INVENTION

The present invention relates to a method and a device for matching two images, each consisting of a plurality of pixels and having partially overlapping contents, the degree of correspondence between the images being determined for different displacement positions which represent different overlappings of the images.

BACKGROUND OF THE INVENTION

The applicant has developed a pen by means of which text can be recorded by the pen being passed over the text which is to be recorded. The pen, which includes, inter alia, a two-dimensional light-sensitive sensor and a signal-processing unit, records images of the text with partially overlapping contents. Subsequently, the images are put together to form a larger image, which does not contain any redundant information. The characters in the image are identified with the aid of OCR software and are stored in character-coded form in the pen. The pen is described in the applicant's Swedish Patent Application No. 9604008-4, which had not been published when the present application was filed.

In order to reduce the memory requirement of the pen, it is desirable that it be possible to put together a recorded image with the previous image before the next image is recorded. A desired image-recording frequency for the pen is about 50 Hz, which thus means that it shall be possible to put together two images in about 20 ms. The most time-consuming operation when putting the images together is the matching of the images, i.e. determining the relative position in which the best possible correspondence between the contents of the images is obtained.

A possible method for matching two images is to examine all possible overlap positions between the images and, for each overlap position, to examine every pair of overlapping pixels, to determine a score for each pair of overlapping pixels, the score depending on how well the values of the pixels correspond, and to then determine which overlap position provides the best match on the basis of the total of the scores for the overlapping pixels in each position. However, this procedure is too slow for the application indicated above.

SUMMARY OF THE INVENTION

In the light of the above, one object of the present invention is thus to provide a new method for automatic matching of two images, which method permits faster matching of two images with a given processor than the method described above.

A further object is to provide a device for the implementation of the method.

The objects are achieved by a method according to claim 1 and a device according to claims 18 and 19. Preferred embodiments are stated in the subclaims.

Like the method described above, the invention is based on determining the degree of correspondence between two images, which each consists of a plurality of pixels and which have partially overlapping contents, for different displacement positions representing different overlappings of the images. However, the comparison of the contents of the images is effected in a more efficient manner. More specifically, a plurality of numbers are determined for each one of a plurality of displacement positions, each number being formed with the aid of pixel values from both images. The numbers are used to retrieve predefined overlap assessment values for at least two displacement positions simultaneously. These overlap assessment values are subsequently used in determining the degree of correspondence between the contents of the images.

By this method, the different displacement positions can be examined with a certain degree of parallelism, making it possible to examine the images more quickly than if all the displacement positions are examined sequentially. This parallelism is achieved with the aid of the numbers, which are used to examine at least two displacement positions simultaneously. Since the numbers are based on the contents of each image, it is possible to calculate in advance the overlap assessment values in the cases where the pixel values which make up the numbers overlap completely or partially. Naturally, the efficiency of the method increases the more pixels are included in each number since this increases the parallelism.

Thus, the overlap assessment values are predefined. What this means is that if a pixel in one of the images has a first given value and the corresponding overlapping pixel in the other image has a second given value, a certain predetermined overlap value is always obtained. The same applies when the overlap assessment values relate to several overlapping pixels. The different overlap assessment values which are obtained for different combinations of pixel values can be determined optionally. They can be defined with the aid of one or more formulae, or tables, or in some other suitable manner.

In this connection, it should be pointed out that, of course, the images are not physically displaced in relation to each other when the method is being implemented, but rather the comparison between the images is carried out for hypothetical displacements.

In a preferred embodiment, the method furthermore comprises the steps of adding up the overlap assessment values for each of said displacement positions, and of using the totals obtained in this manner to determine which of the displacement positions provides the best possible match between the contents of the images. The overlap assessment values which are added together for a certain displacement position preferably reflect the degree of correspondence between all overlapping pixels for that displacement position.

In order further to increase the matching speed, the overlap assessment values are suitably added up in parallel for several displacement positions. The adding-up becomes particularly advantageous if it is carried out in parallel for the overlap assessment values which are retrieved simultaneously with the aid of a number.

Each overlap assessment value can relate to one or more overlapping pixels. In the latter case, a matching speed increase is achieved by the fact that it is not necessary to add up the assessment values for each overlapping pixel for a certain displacement position, but rather overlap assessment values which have already been added up for two or more overlapping pixels can be retrieved directly.

When the displacement position which provides the best match between the contents of the images has been determined, the images can be put together in this relative position. The putting-together can be effected by the overlapping pixel values in one of the images being rejected or, preferably, by a combined weighting of the pixel values for each overlapping pixel.

The plurality of displacement positions for which numbers are determined can suitably constitute rough displacement positions, and said at least two displacement positions for which the overlap assessment values are retrieved can suitably comprise at least one fine displacement position, representing a smaller displacement from a rough displacement position than the displacement between two rough displacement positions. The second overlap assessment value retrieved can relate to the rough displacement position in question or to another fine displacement position.

In the simplest embodiment of the method, the contents of the images are displaced in relation to each other in one direction only. However, the method can also be employed when the images are displaced in two different, preferably perpendicular, directions in relation to each other. In this case, in order to arrive at the position in which the correspondence between the contents of the images is at a maximum, it is suitable to let the rough displacement positions represent different overlappings of the images in the first direction, for example horizontally, and to repeat the method for different overlappings of the images in the other direction, for example vertically.

The rough displacement positions, which thus constitute a subset of the displacement positions examined, are preferably determined by the images being divided into a plurality of rough segments consisting of N×M pixels where N and M are greater than one, the displacement between the two adjoining rough displacement positions consisting of a rough segment. The rough segments can thus be achieved by the images being divided into columns or rows, each having the width and the height of several pixels.

The images can be represented in various ways. They can be analogue, but it is preferable that they be digital since this facilitates their processing with the aid of a computer. The pixel values can be represented with different resolutions. However, the method is preferably intended for images which are represented as bitmaps.

As mentioned above, the numbers are based on the contents of the two images. In a preferred embodiment the numbers are used as addresses for memory locations, which store the overlap assessment values. In this case, the latter are suitably defined by quite simply being calculated or determined in advance.

Preferably, the addresses are used for addressing a lookup table which, for each address, contains said pre-calculated overlap assessment values for at least two displacement positions. The order in which the pixels values are used in the address is of no importance as long as the same order is used for all addresses and as long as the storing of the overlap assessment values in the lookup table is carried out in a predetermined manner in relation to said order.

The method according to the invention can be implemented entirely in hardware. In that case, the numbers can, for example, form input signals for a gate circuit which has been designed in such a way that for each given set of input signals the corresponding overlap assessment values are produced as output signals. Thus, in this case, the overlap assessment values are defined by the design of the gate circuit. This method can be advantageous for large images.

However, in a preferred embodiment, the method is implemented in software with the aid of a processor which works with a predetermined word length. In this case, the lookup table comprises a plurality of addressable rows, each of which has the predetermined word length and stores the pre-calculated overlap assessment values. By adjusting the width of the table to the word length of the processor, the best possible utilisation of the capacity of the processor is obtained. For example, different rows in the table can be added up in an efficient manner.

The various parameters for the method, i.e. the rough displacement positions, the number of overlap assessment values stored for each address, the number of tables, etc., are suitably determined on the basis of the processor utilised and its cache memory in order to achieve the highest speed possible. Preferably, the parameters are chosen so that the two images and all of the pre-calculated overlap assessment values can be contained in the cache memory.

In a preferred embodiment, each number is formed by a first fine segment, which comprises at least two adjoining pixels values from the first image, and by a second fine segment, which overlaps the first fine segment and which comprises as many adjoining pixel values as the first fine segment from the second image, and a third fine segment, which comprises as many adjoining pixel values as the first fine segment from the second image and which overlaps the first fine segment in an adjacent displacement position for which the determination of a plurality of numbers is carried out, i.e. an adjacent rough displacement position. In this way, the number will include all pixel values which can overlap in a rough displacement position and in all fine displacement positions between this rough displacement position and the subsequent rough displacement position, as well as in this subsequent rough displacement position. Accordingly, it is possible to retrieve, with the number, pre-calculated overlap assessment values for all of these displacement positions.

In order to save memory space so that all necessary information can be stored in the cache memory of a processor and thus be quickly accessible, each address is advantageously divided into a first and a second subaddress, the first subaddress, which consists of the pixel values from the first and the second fine segment, being used to simultaneously retrieve overlap assessment values in a first table for overlapping pixels belonging to the first and the second fine segment, and the second subaddress, which consists of the pixel values from the first and the third fine segment, being used to simultaneously retrieve overlap assessment values in a second table for overlapping pixels belonging to the first and the third segment.

In this case, for each address, the first and the second table preferably store an overlap assessment value for each one of said at least two displacement positions, the sum of the two overlap assessment values for a first displacement position, which is retrieved with the first and second subaddresses of an address, constituting an overlap assessment value for all overlapping pixels of the first, the second, and the third fine segment for said first displacement position. The overlap assessment values are preferably stored in the same order with respect to the displacement positions for each address, so that they can be easily added up.

In order further to increase the matching speed, the degree of correspondence between the images is first determined with a first resolution of the images for selection of a plurality of displacement positions and subsequently with a second, higher resolution of the images for the displacement positions selected and adjoining displacement positions. In this way, it is possible to reject whole areas of the image which are not of interest for further examination.

More specifically, a device according to the invention has a processing unit which is adapted to implement a method according to any one of claims 1–17. The processing unit can be connected to a unit for recording images and can process the images in real time. The device exhibits the same advantages as the method described above, that is, it permits a quicker matching of the images.

In a preferred embodiment, the invention is implemented in the form of a computer program which is stored in a storage medium which is readable with the aid of a computer.

The method according to the invention can be used to examine all possible displacement positions or only a selection. For example, the displacement position in an earlier matching can be used to limit the number of positions which need checking.

The invention is applicable to all types of matching of images. It can be used when two images are to be matched in order to subsequently be put together in the position which affords the best correspondence between the contents of the images. It can also be used to match two images when one wishes to check how the images overlap. The invention is especially applicable when a high matching speed is required.

BRIEF DESCRIPTION OF THE DRAWINGS

An example of how the invention can be implemented will be described below with reference to the accompanying schematic drawings.

FIG. 3 shows how an address is formed with the aid of pixel values from a plurality of overlapping pixels in two images.

FIG. 5 shows how the overlap assessment values are calculated for various displacement positions.

FIG. 6 shows how overlap assessment values are stored and retrieved in the case where subaddresses are employed.

FIG. 7 shows how overlap values for a plurality of different displacement positions are added up simultaneously.

FIG. 8 schematically shows how the scores for four displacement positions are added up in parallel.

DESCRIPTION OF A PREFERRED EMBODIMENT

A presently preferred embodiment of a method for matching two images with partially overlapping contents will be described below. The purpose of the method is to find the overlap position which provides the best possible correspondence between the contents of the images. In order to determine what constitutes the best possible correspondence, a predetermined assessment criterion is employed.

In this example, the method is implemented in software with the aid of a 32-bit processor with a clock frequency of 100 MHz and with a 16 kB cache memory, in which the images which are to be matched are stored. An example of a processor of this type is StrongARM supplied by Digital. The processor operates under the control of a program which is read into the program memory of the processor.

The way in which the images are picked up and fed into the cache memory of the processor lies outside the scope of the present invention and will therefore not be described in more detail. One way, however, is to use the same technique as in the pen described by way of introduction, that is, to record the images with a light-sensitive, two-dimensional sensor and to store them in a memory, from which the processor can read the images into its cache memory.

Figure 1:
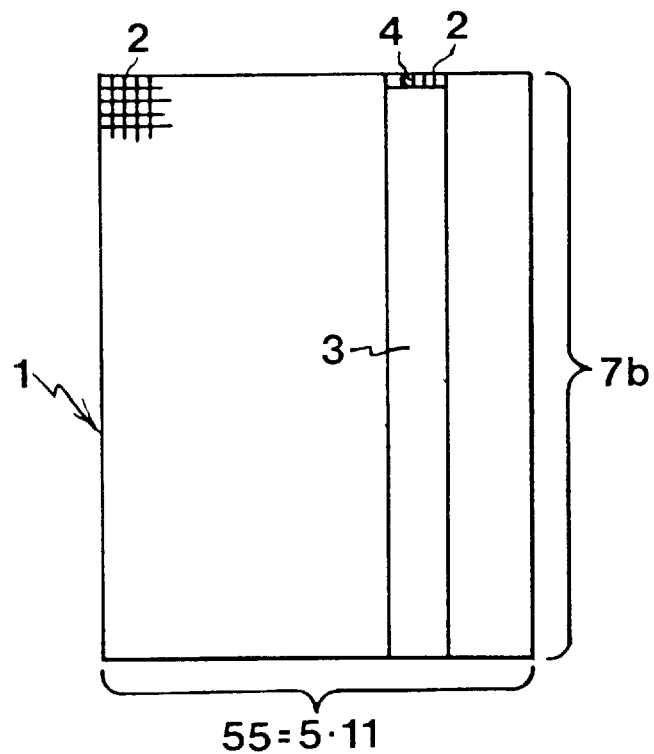
FIG. 1 shows an image consisting of a plurality of pixels, with one rough segment and one fine segment indicated.

FIG. 1 schematically shows a digital image 1 consisting of a plurality of pixels 2 of which some are schematically indicated as squares. The image is to be matched with a like image with partially the same contents.

The image is 55 pixels wide and 76 pixels high. It is stored as a bitmap, each pixel thus having the value one or zero. In this example, the value one represents a black dot and the value zero a white dot.

For the implementation of the method, each image is divided into eleven rough segments 3 in the form of vertical bands, each being five pixels wide and 76 pixels high. Each rough segment is divided into fine segments 4, each consisting of a horizontal row of five adjoining pixels.

Figure 2:
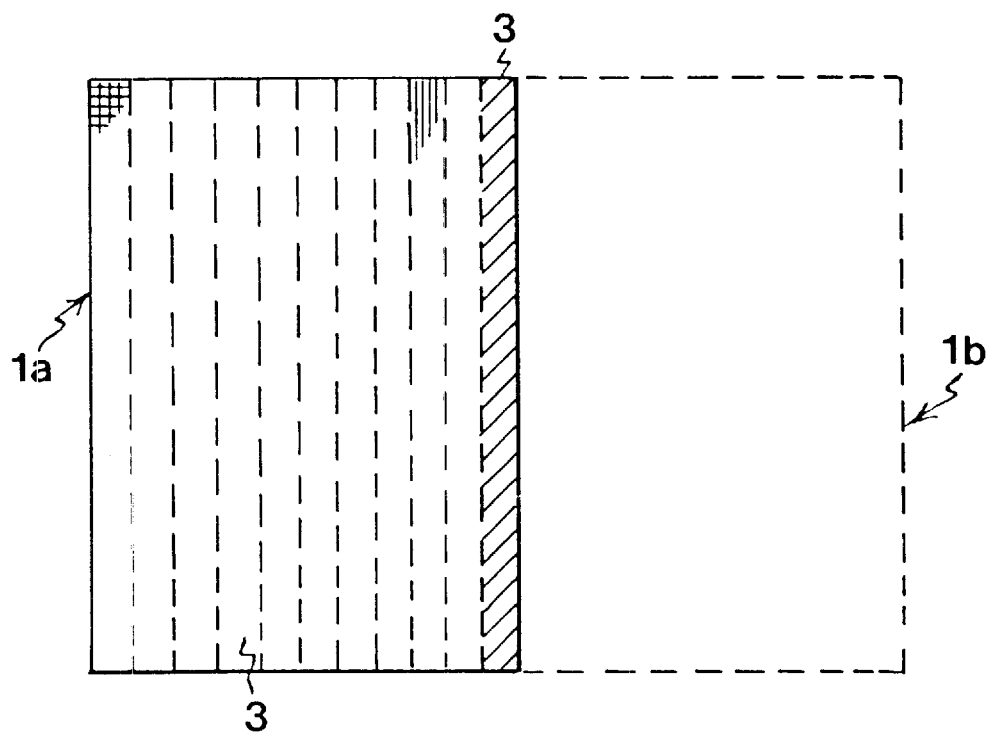
FIG. 2 shows a hypothetical overlapping of two images.

The rough segments 3 are employed to define a plurality of rough displacement positions. FIG. 2 shows a first rough displacement position, in which two images 1a and 1b are displaced in relation to each other in such a way that one rough segment 3, indicated by slanting lines, from each image overlap one another. In a second rough displacement position, two rough segments from each image will overlap, etc. up to an eleventh rough displacement position in which all the rough segments overlap. The difference between two adjoining rough displacement positions is thus one rough segment.

In each rough segment, four fine displacement positions are defined. These represent a displacement in relation to a rough displacement position by one, two, three and four pixel columns.

The rough displacement positions and the fine displacement positions represent displacements between the images in a first direction, viz. horizontally. If the images can also be displaced vertically in relation to each other, a number of vertical displacement positions are defined, each vertical displacement position representing a displacement by one pixel row vertically. The left part of FIG. 3 shows a vertical displacement position for a first image 1a and a second image 1b, which is indicated by dashed lines in the overlap position.

The fine segments 4 are employed to determine a number of 10-bit subaddresses which in turn are employed to retrieve pre-calculated overlap assessment values, each providing a measure of the degree of correspondence between one or more overlapping pixels for a certain displacement position. A first subaddress is formed by the five least significant bits of the address being retrieved from a first fine segment 4a in the first image 1a and the five most significant bits being retrieved from the corresponding overlapping fine segment 4b in the second image 1b. The first subaddress thus represents the value for overlapping pixels which one wishes to compare in order to check the degree of correspondence with respect to contents.

FIG. 3 shows an example of how the first fine segment 4a of five bits "10010" is retrieved from the one image 1a and the second fine segment 4b of five bits "01100" is retrieved from the other image 1b and are put together into the address "0110010010".

The first subaddresses are employed to address two tables of 1024 rows each (the number of possible different addresses). The tables are shown schematically as Tables 1 and 2 in FIG. 4. In the tables, which like the images are stored in the cache memory of the processor, there are pre-calculated overlap assessment values (called scores in the following). This is shown schematically in FIG. 4 by way of an enlargement of a row in each table.

In this example, the scores are calculated as follows. Two overlapping white pixels equal one point, two overlapping black pixels equal two points, while one white and one black overlapping pixel equal zero points.

Figure 4:
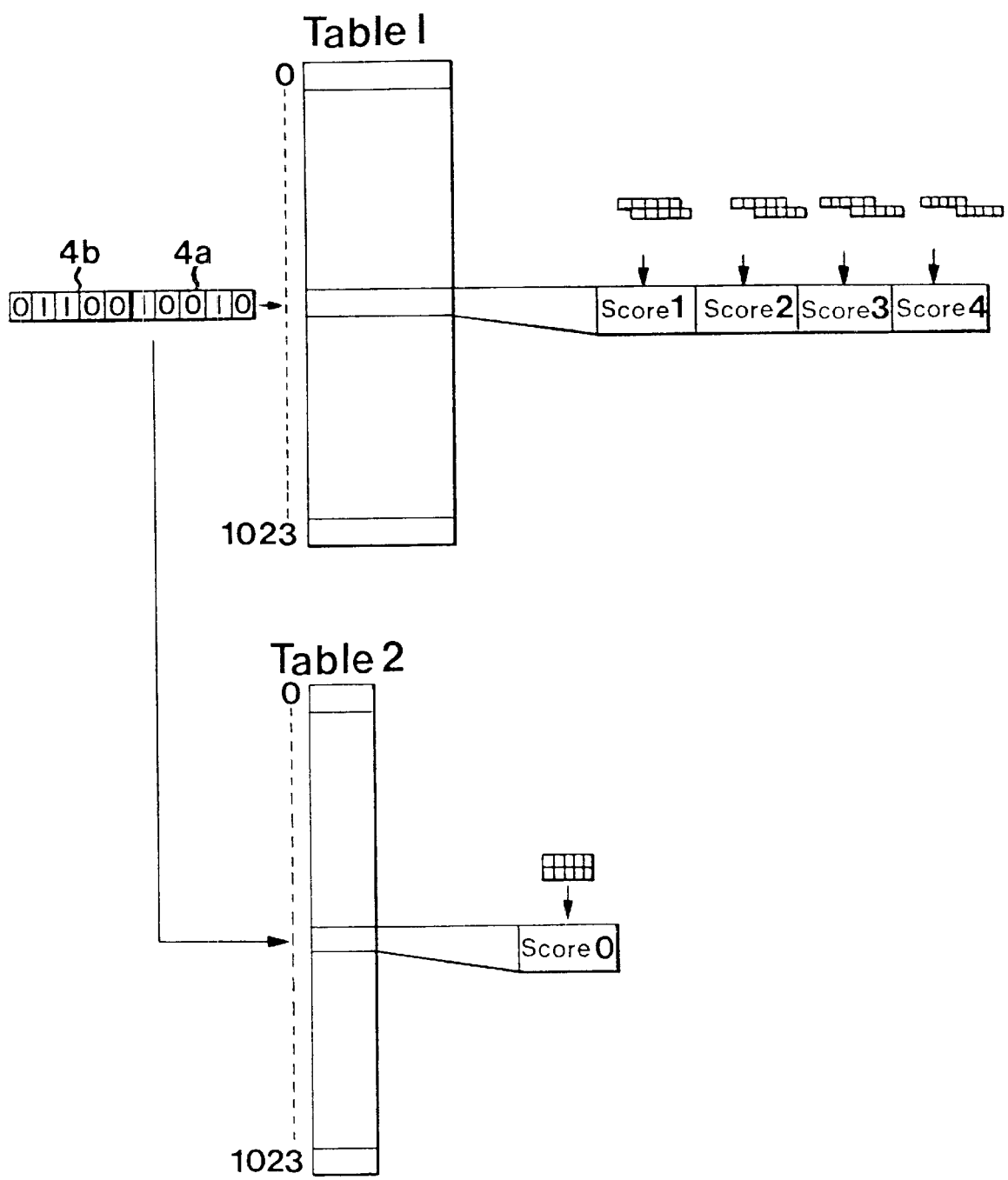
FIG. 4 shows how the overlap assessment values for a plurality of different overlap positions are stored and retrieved simultaneously.

FIG. 5 shows the scores which are stored in the tables in FIG. 4 in the row with the address "0110010010" and how these are calculated. Score 0 is stored in Table 2 and Scores 1–4 are stored in Table 1. For each overlapping pixel, a score is achieved in accordance with the scoring set out above. The scores for all overlapping pixels are added to arrive at the total score or the overlap assessment value which is to be stored in the table in the row with the address in question.

Table 2 in FIG. 4 contains, for each address, the score (Score 0) achieved when the two fine segments overlap completely, i.e. the overlapping which is obtained in the rough displacement position. This score is the total of the scores for five overlapping pixels and is stored in one byte. Table 1 contains, for each address, the scores (Scores 1–4) which are achieved when the two fine segments are partially displaced in relation to each other, i.e. corresponding to various fine displacement positions. These scores are stored in one byte each in a 32-bit word and can accordingly be retrieved at the same time with one reading or one table lookup during one clock cycle. Score 1 relates to the score achieved when the fine segments are displaced by one increment in relation to each other, so that only four overlapping pixels are obtained. Score 2 relates to the score achieved when the fine segments are displaced by two increments in relation to each other, so that only three overlapping pixels are obtained, etc. The displacements reflect the overlapping obtained in the fine displacement positions between the rough displacement position in question and the following rough displacement position.

As can be seen from the above, the overlap assessment values which are retrieved using the first subaddress relate only to overlappings between the pixels in the first and the second fine segment for the displacement positions examined. The overlappings which occur in these displacement positions between the pixels in the first fine segment and pixels other than the ones in the second fine segment are not picked up with the aid of the method described above.

In order to permit the examination of these overlappings as well, a second subaddress is formed in addition to the first subaddress. This second subaddress consists of the five pixel values in the first fine segment 4a as well as five pixel values for a third fine segment 4c which adjoins the second fine segment in the second image 1b and which overlaps the first fine segment in the subsequent rough displacement position.

FIG. 6 shows an example of how the second subaddress is formed. The pixel values "10010" from the first fine segment 4a in the first image 1a constitute the five most significant bits of the second subaddress, while the pixel values "10101" from the third fine segment 4c in the second image 1b constitute the five least significant bits in the second subaddress.

The scores or the overlap assessment values for the pixels in the first and the third fine segment which overlap in different displacement positions are stored in a third table, which is indicated as Table 3 in FIG. 7. The scores are, of course, calculated in the same manner as in the case of Table 1, but the scores are stored in "reverse order". Accordingly, Score 4, which relates to one overlapping pixel of the first and the third fine segment, is stored in the first byte of a table row in Table 3. Score 3, which relates to two overlapping pixels of the first and the third segment, is stored in the second byte, etc.

In this way, overlap values for four fine displacement positions can be retrieved with the aid of the first and the second subaddress. By adding up the overlap values for the first and the second subaddress an overlap value is obtained for each displacement position. Each of these overlap values relates to five overlapping pixels for the displacement position in question.

FIG. 7 shows Tables 1 and 3, a first and a second subaddress employed to address these tables, and the overlap assessment values in separate rows of the table.

A description of how the matching of the images is performed is given below. First, a first rough displacement position is chosen. For this position, a first pair of overlapping fine segments is chosen. Suppose that the first fine segment in the first image has the pixel values "10010" and that the second fine segment in the second image has the pixel values "01100", as in the example in FIG. 3. These values are used to form the first binary subaddress "0110010010". Moreover, suppose that a third fine segment which adjoins the second fine segment in the second image has the values "10101". These values are used together with the pixel values for the first fine segment to form the second subaddress "1001010101". The first subaddress is employed to address both the first and the second table. In the example given, the scores 4, 3, 0, and 1 stored in one word are obtained from the first table and the score 1 is obtained from the second table. The second subaddress is employed to address the third table, from which the scores 2, 0, 3, 3 are obtained in the example given. The scores from Tables 1 and 3 are added up in parallel, the total scores 6, 3, 3, 4 being obtained.

When these first overlapping fine segments have been compared, the matching continues with two new overlapping fine segments, until a complete comparison between the overlapping rough segment or segments has been performed.

Each time a word is obtained with the four scores added up for Tables 1 and 3, the word is added to the words previously obtained. The scores for four different displacement positions are thus added up in parallel by means of one single addition. Since the scores are low, a large number of additions can be performed before there is a carry and, consequently, before any storing in a different location has to be done. The scores from the second table are added up in the same way. FIG. 8 schematically shows how the scores for four displacement positions are added up in parallel, the word A representing the word obtained with a first address, consisting of a first and a second subaddress, and the word B representing the word obtained with a second address, consisting of a first and a second subaddress, and the word C representing the total obtained.

When all overlapping fine segments have been examined for the first rough displacement position, the procedure is repeated for the second and subsequent rough displacement positions until all rough displacement positions have been examined.

If the images can also be displaced vertically in relation to each other, the method is repeated for each vertical position, the images thus first being displaced one row vertically in relation to each other and subsequently all rough and fine displacement positions being examined, whereupon the images are displaced to the next vertical displacement position and are examined and so on until all vertical displacement positions have been scanned.

When all displacement positions have been examined a score will have been obtained for each position. With the assessment criterion used in this example, the highest score will represent the displacement position which provides the best overlapping of the contents of the images.

In a presently preferred embodiment of the invention, an overlap assessment is first carried out in the manner described above with a lower resolution of the images than the one with which they are stored. In this example, a resolution of 25×30 pixels is used. The purpose of this is the quick selection of relevant displacement positions for closer examination of the correspondence between the contents of the images. Subsequently, the method is repeated for the images in these and adjoining displacement positions for the original resolution.

In the above example, the overlap assessment values are stored in three different tables. This has been done in order to utilise the processor optimally. In the case of other processors, it may instead be suitable to store all overlap assessment values in one table or in more than three tables. This can be determined by the skilled person on the basis of the above description.

What is claimed is:

1. A method for matching a first and a second image, each consisting of a plurality of binary pixels and having partially overlapping contents, the degree of correspondence between the contents of the images being determined for different displacement positions which represent different overlappings of the images, comprising the following steps:

determining a correlation score retrieval number for each of a plurality of coarse displacement positions of said first image relative to said second image, each correlation score retrieval number being determined from at least two pixel values from each image corresponding to each coarse displacement position, using said correlation score retrieval number to retrieve corresponding predefined correlation scores for at least two fine displacement positions simultaneously, and using the correlation scores in determining the degree of correspondence between the contents of the images.

2. A method according to claim 1, further comprising the steps of:

determining, at said coarse displacement position, a second correlation score retrieval number from at least two pixel values from each image different from said first correlation score retrieval number and retrieving a corresponding correlation score;

adding up the correlation scores for said coarse displacement position; and using the totals obtained in this manner to determine which of coarse and fine displacement positions provide the best correspondence between the contents of the images.

3. A method according to claim 2, wherein the correlation scores are added up in parallel for a plurality of fine displacement positions.

4. A method according to claim 1, wherein at least one of the correlation scores relate to more than one overlapping pixel.

5. A method according to claim 1, further comprising the step of putting together the images in the displacement posit on which provides the best correspondence between the images.

6. A method according to claim 1, wherein the coarse displacement positions represent different overlappings of the images in a first direction, and further comprising the step of repeating the method for different overlappings of the images in a second direction.

7. A method according to claim 1, wherein the coarse displacement positions are determined by the images being divided into a plurality of coarse segments consisting of N×M pixels, where N and M are greater than one, the displacement between two adjoining coarse displacement positions consisting of a coarse segment.

8. A method according to claim 1, wherein the correlation score retrieval numbers constitute addresses of memory locations, which store said correlation scores consisting of predefined values.

9. A method according to claim 8, wherein the addresses are employed to address at least one lookup table which, for each address, contains the predefined correlation scores for at least two fine displacement positions.

10. A method according to claim 9, which method is performed with the aid of a processor working with a pre-determined word length and wherein said at least one lookup table comprise a plurality of addressable rows, each having the predetermined word length and storing said predefined correlation scores.

11. A method according to claim 10, wherein the storing of the correlation scores is performed in such a manner that all correlation scores as well as the images which are to be matched can be contained in a cache memory in the processor.

12. A method according to claim 1, further comprising the step of forming each correlation score retrieval number of first fine segment, which comprises at least two adjoining pixel values from the first image, and of a second fine segment, which overlaps the first fine segment and which comprises as many adjoining pixel values as the first fine segment from the second image, and of a third fine segment, which comprises as many adjoining pixel values as the first fine segment from the second image and which overlaps the first fine segment in an adjacent displacement position, for which the determination of a plurality of correlation score retrieval numbers is carried out.

13. A method according to claim 12, wherein the correlation score retrieval numbers constitute addresses of memory locations which store said correlation scores consisting of predefined values and wherein each address is divided into a first and a second subaddress, the first subaddress, which consists of the pixel values from the first and the second fine segment, being used to simultaneously retrieve correlation scores in a first table for overlapping pixels belonging to the first and the second fine segment, and the second subaddress, which consists of the pixel values from the first and the third fine segment, being used to simultaneously retrieve correlation scores in a second table or overlapping pixels belonging to the first and the third segment.

14. A method according to claim 13, wherein, for each address, the first and the second table store a correlation score for each one of said at least two displacement positions, and wherein the sum of the correlation scores for a first displacement position, which is retrieved using the first and second sub-addresses of an address, constitutes a correlation score for all overlapping pixels between the first, the second, and the third fine segment for said first displacement position.

15. A method according to claim 1, wherein the degree of correspondence between the images is first determined with a first resolution of the images for selection of a plurality of displacement positions, and is subsequently determined with a second, higher resolution of the images for the displacement positions selected and adjoining displacement positions.

16. A device for matching a first and a second image, each consisting of a plurality of binary pixels and having partially overlapping contents, characterized by a processing unit which is adapted to implement a method according to claim 1.

17. A device for matching a first and a second image, each consisting of a plurality of binary pixels and having partially overlapping contents, which device comprises a storage medium, which is readable with the aid of a computer and in which is stored a compute program for implementing the method according to claim 1.

18. A method for determining the degree of correspondence between a first image and a second image, each image consisting of a plurality of binary pixels and having partially overlapping contents, comprising the following steps:

forming a score retrieval number using one or more pixel values from the first image and one or more pixel values from the second image;

using the score retrieval number to simultaneously retrieve at least two scores; each score being a fixed correlation value for a relative displacement of the pixel values from the first image with respect to the pixel values from the second image; and using the scores in determining the degree of correspondence between the contents of the first image and the second image.

19. A method of determining a correlation score for a first and a second image having partially overlapping contents, each image being stored in a memory in the form of a pixelmap each pixel being binary and having two conditions, one and zero, comprising the steps of:

selecting at least two pixels from the first image, forming at least two first bits, selecting at east two pixels from the second image, forming at least two second bits;

forming a binary address by defining said at least two first bits as the least significant bits of said address and said at least two second bits as the most significant bits of said address; and accessing a table by said binary address to retrieve at least one correlation score.

20. A method as claimed in claim 19, further comprising the steps of:

repeating the selection of pixels from said first and second images;

retrieving correlation scores from each combined selection; and determining best match as the selection having the highest correlation score.

21. A method as claimed in claim 19, wherein the said correlation score of said table is precalculated by bitwise comparing said first bits and said second bits whereas if the bits in the bitpair are unequal, the score is zero, if the bits in the bitpair both are zero, the score is one, and if the bits in the bitpair both are one the score is two, and the scores for the bitpairs are summed to give the correlation score.

22. A method as claimed in claim 19, wherein said at least two pixels from said first and second images are adjacent pixels arranged in any one of a row and a column.

23. A method as claimed in claim 19, further comprising the steps of:

determining a coarse relative position between the images;

selecting said at least two pixels from said first image; and selecting said at least two pixels from a corresponding position of said second image for retrieval of said at least one correlation score.

24. A method as claimed in claim 23, further comprising the steps of:

selecting, in said coarse relative position between the images, another at least two pixels from said first image and selecting another at least two pixels from said second image for retrieval of another at least one correlation score; and adding said at least one correlation retrieval score and said another at least one correlation retrieval score.

25. A method as claimed in claim 23, wherein said at least one correlation score comprises at least two correlation scores corresponding to fine displacements of the images relative to each other from said coarse relative position.

26. A method as claimed in claim 19, wherein said at least two pixels comprises five pixels.

27. A method as claimed in claim 19, further comprising the steps of: assembling the images in the displacement position which provides the best correspondence between the images.

28. A device for determining a match between a first and a second image having partially overlapping contents, each image being stored in a memory in the form of a pixelmap each pixel being binary and having two conditions, one and zero, comprising:

a selection means for selecting at least two pixels from the first image, forming at least two first bits;

a selection means for selecting at least two pixels from the second image, forming at least two second bits;

an address means for forming a binary address by defining said at least two first bits as the least significant bits of said address and said at least two second bits as the most significant bits of said address; and an access means for accessing a table by said binary address to retrieve at east one correlation score.

* * * * *